United States Patent
Lee et al.

(10) Patent No.: US 9,880,418 B2
(45) Date of Patent: Jan. 30, 2018

(54) DISPLAY APPARATUS

(71) Applicant: SAMSUNG ELECTRONICS CO., LTD., Suwon-si (KR)

(72) Inventors: Jae Kwon Lee, Yongin-si (KR); Sung Ok Kim, Yongin-si (KR); Dea Woo Ryu, Suwon-si (KR); Yong Gil Lee, Yesan-gun (KR); Chang Ho Cho, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 19 days.

(21) Appl. No.: 15/012,252

(22) Filed: Feb. 1, 2016

(65) Prior Publication Data
US 2016/0223866 A1   Aug. 4, 2016

(30) Foreign Application Priority Data
Jan. 30, 2015   (KR) .................. 10-2015-0015497

(51) Int. Cl.
*G09F 13/04* (2006.01)
*G02F 1/1335* (2006.01)

(52) U.S. Cl.
CPC .. *G02F 1/133608* (2013.01); *G02F 1/133603* (2013.01); *G02F 2201/46* (2013.01)

(58) Field of Classification Search
CPC ........... F21Y 2115/10; G02F 1/133308; G02F 2001/133314; G02F 2001/133322; G02F 2201/46; G02F 1/1333; G02F 1/133603; G02F 1/133608; G02F 2001/133317; G02F 2001/13332; G02F 2201/465; G06F 1/1601

USPC ................................................... 362/97, 97.1
See application file for complete search history.

(56) References Cited

U.S. PATENT DOCUMENTS

| | | | | |
|---|---|---|---|---|
| 6,919,937 B2* | 7/2005 | Kim | ................. | G02F 1/133308 349/58 |
| 7,758,000 B2* | 7/2010 | Hsieh | ..................... | F16M 11/10 248/176.1 |
| 2008/0013271 A1* | 1/2008 | Peng | ........................ | G06F 1/187 361/679.31 |

(Continued)

FOREIGN PATENT DOCUMENTS

| EP | 1 956 422 A2 | 8/2008 |
|---|---|---|
| EP | 1 956 422 A3 | 8/2008 |

(Continued)

OTHER PUBLICATIONS

Communication dated Apr. 22, 2016 issued by the European Patent Office in counterpart European Patent Application No. 15199897.8.

*Primary Examiner* — Thien M Le
(74) *Attorney, Agent, or Firm* — Sughrue Mion, PLLC

(57) ABSTRACT

A display apparatus is provided. The display apparatus includes a display panel, a substrate, and a bottom chassis. The substrate is provided with light sources to emit light towards the display panel. The substrate includes a fixing hole formed between the light sources. The substrate is coupled to the bottom chassis. The bottom chassis includes a fixing protrusion to be coupled to the fixing hole. The fixing protrusion is formed with the bottom chassis to have a detachment prevention structure so that the fixing protrusion is prevented from being detached from the fixing hole.

20 Claims, 18 Drawing Sheets

(56) References Cited

U.S. PATENT DOCUMENTS

| | | | |
|---|---|---|---|
| 2008/0094789 A1* | 4/2008 | Lee | G06F 1/1601 |
| | | | 361/679.01 |
| 2008/0316391 A1 | 12/2008 | Hsiao | |
| 2009/0190330 A1* | 7/2009 | Kim | G02F 1/133603 |
| | | | 362/97.2 |
| 2011/0221980 A1* | 9/2011 | Kawabata | G02F 1/133308 |
| | | | 348/794 |
| 2011/0249203 A1 | 10/2011 | Takeba | |
| 2012/0092562 A1 | 4/2012 | Omiya et al. | |
| 2012/0321230 A1* | 12/2012 | Chen | A47B 88/0418 |
| | | | 384/41 |
| 2014/0112001 A1* | 4/2014 | Noh | F21V 23/02 |
| | | | 362/311.01 |
| 2014/0153284 A1 | 6/2014 | Hong | |

FOREIGN PATENT DOCUMENTS

| | | |
|---|---|---|
| EP | 2 447 765 A2 | 5/2012 |
| JP | 2011-34949 A | 2/2011 |
| KR | 10-0971735 B1 | 7/2010 |
| KR | 10-1218797 B1 | 1/2013 |

\* cited by examiner

DISPLAY APPARATUS

CROSS-REFERENCE TO RELATED APPLICATION

This application claims priority from Korean Patent Application No. 2015-0015497, filed on Jan. 30, 2015 in the Korean Intellectual Property Office, the disclosure of which is herein incorporated by reference.

BACKGROUND

1. Field

Apparatuses and devices consistent with the present disclosure relate to a display apparatus having an improved backlight connecting structure.

2. Description of the Related Art

A display apparatus is configured to convert electrical information into visual information and to display the visual information to a user, and includes a television, a monitor and a variety of mobile terminals, e.g. smart phone and table PC.

The display apparatus may be of several types including a display apparatus using Cathode Ray Tube, a display apparatus using Light Emitting Diode, a display apparatus using Organic Light Emitting Diode, a display apparatus using Active-Matrix Organic Light Emitting Diode, a Liquid Crystal Display, or an electronic paper display apparatus.

The liquid crystal display apparatus is light, has low power consumption, and has a slim profile, and thus its application range, e.g. a television, a monitor, and a portable display, has been gradually widened. However, a liquid crystal display apparatus is provided with a backlight, and there a disadvantage in that foreign material, e.g., dust, may be introduced to the inside of a housing of the display apparatus due to the mounting of the backlight in the housing. To prevent the introduction of foreign matter, a piece of tape may be applied. However, the use of tape increases the cost of manufacturing and makes the manufacturing process more complicated due to the taping operation.

SUMMARY

Therefore, it is an aspect to provide a display apparatus having an improved structure configured to prevent foreign material from being introduced to the inside thereof.

It is another aspect to provide a display apparatus having an improved structure configured to simplify the manufacturing process.

It is another aspect to provide a display apparatus having an improved structure configured to reduce the production cost.

It is another aspect to provide a display apparatus having an improved structure configured to allow a backlight to be coupled to a bottom chassis easily.

Additional aspects of the disclosure will be set forth in part in the description which follows and, in part, will be obvious from the description, or may be learned by practice of the disclosure.

According to an aspect of one or more exemplary embodiments, there is provided a display panel; a substrate provided with a plurality of light sources to emit light toward the display panel, the substrate including at least one fixing hole formed between the plurality of light sources; and a bottom chassis to which the substrate is coupled, the bottom chassis including at least one fixing protrusion to be coupled to the at least one fixing hole, wherein the at least one fixing protrusion is formed with the bottom chassis to have a detachment prevention structure so that the at least one fixing protrusion is prevented from being detached from the at least one fixing hole.

The substrate may be detachably coupled to the bottom chassis.

The substrate may be coupled to the bottom chassis in a sliding manner.

The substrate may be coupled to the bottom chassis such that the plurality of light sources face the display panel to emit light toward the display panel.

A recess may be formed in the bottom chassis; the recess may be recessed toward a first direction, which is toward the display panel in a thickness direction of the bottom chassis, and toward a second direction opposite to the first direction, and the at least one fixing protrusion may be formed in the recess.

The at least one fixing hole may comprise a first coupling and a second coupling, which is connected to the first coupling in a longitudinal direction of the substrate and has a different width from a width of the first coupling in a width direction of the substrate.

The at least one fixing protrusion may be inserted into the first coupling, and then fixedly coupled to the second coupling in a sliding manner in the longitudinal direction of the substrate.

The detachment prevention structure may be formed to be recessed along at least one portion of the circumference of the at least one fixing protrusion.

The detachment prevention structure may comprise a first groove recessed on a side of the at least one fixing protrusion and a second groove recessed on another side of the at least one fixing protrusion to be spaced apart from the first groove, wherein the at least one fixing protrusion is fixedly coupled to the at least one fixing hole in a sliding manner while the second coupling is inserted into and coupled to the first groove and the second groove.

The second coupling may comprise guide walls connected to the first coupling in the longitudinal direction of the substrate, and a limiter configured to connect the guide walls on a side of the second coupling that is away from the first coupling, and configured to limit the movement of the at least one fixing protrusion toward the second coupling from the first coupling in the longitudinal direction of the substrate, wherein one of the guide walls is coupled to the first groove and another of the guide walls is coupled to the second groove when the at least one fixing protrusion is moved from the first coupling to the second coupling in a sliding manner.

According to another aspect of one or more exemplary embodiments, there is provided a display apparatus comprising a display panel; a substrate provided with a plurality of light sources to apply a light to the display panel, the substrate comprising at least one fixing hole; and a bottom chassis, to which the substrate is coupled so that the plurality of light sources face the display panel to emit light toward the display panel, the bottom chassis formed with at least one fixing protrusion having a protruding shape toward the display panel to be coupled to the at least one fixing hole.

The at least one fixing protrusion may be detachably coupled to the at least one fixing hole in a sliding manner.

The at least one fixing hole may comprise a first coupling and a second coupling, which is connected to the first coupling in a longitudinal direction of the substrate and has a smaller width than a width of the first coupling in a width direction of the substrate.

The at least one fixing protrusion may comprise a groove recessed along at least one portion of the circumference of the at least one fixing protrusion, the second coupling may comprise guide walls connected to the first coupling in the longitudinal direction of the substrate and disposed in parallel with each other, and at least one of the guide walls may be coupled to the groove when the at least one fixing protrusion is slid from the first coupling to the second coupling.

The second coupling may further comprise a limiter having a curved surface shape, configured to limit movement of the at least one fixing protrusion toward the second coupling from the first coupling in the longitudinal direction of the substrate, and configured to connect the guide walls.

The bottom chassis may comprise a recess formed therein, the recess recessed to be spaced apart from a contact surface between the substrate and the bottom chassis, wherein the at least one fixing protrusion is provided in the recess.

According to another aspect of one or more exemplary embodiment, there is provided a display apparatus comprising a display panel; a bottom chassis having a recess formed therein and comprising a boss that is formed in the recess, the boss comprising at least one groove in a side surface thereof; a backlight comprising a substrate provided with at least one light source that emits light toward the display panel, the substrate comprising a hole and guide walls connected to the hole, the guide walls having a width therebetween that is smaller than a circumference of the hole, wherein, when the boss is inserted in the hole and slid along the guide walls, the at least one groove couples the boss to the guide walls to secure the backlight to the bottom chassis.

The substrate may contact the bottom chassis at a contact surface, and the recess may be downwardly spaced apart from the contact surface in a thickness direction of the bottom chassis.

The recess may be downwardly spaced apart from the contact surface by an amount such that the at least one groove of the boss provided in the recess mates with the guide walls.

The bottom chassis may have a plurality of the recesses formed therein, each recess comprising a respective boss, each boss comprising at least one groove in a side surface thereof, the substrate may be provided with a plurality of light sources, each light source comprising, adjacent thereto, a hole and guide walls connected to the hole, and when the bosses are inserted in the holes, respectively, and slid along the guide walls, the grooves of the bosses may couple the bosses to the guide walls to secure the substrate to the bottom chassis.

BRIEF DESCRIPTION OF THE DRAWINGS

These and/or other aspects will become apparent and more readily appreciated from the following description of exemplary embodiments, taken in conjunction with the accompanying drawings of which.

DETAILED DESCRIPTION

Exemplary embodiments will now be described more fully hereinafter with reference to the accompanying drawings, in which the exemplary embodiments are shown. The terms front edge, rear edge, upper portion, lower portion, upper edge, and lower edge etc., may be defined with respect to the drawings, and may be used to distinguish one component from another component. However, the components should not be limited by these terms.

A liquid crystal display apparatus may include a display panel configured to display a screen and a backlight configured to supply light to the display panel.

The backlight may be fixedly coupled to a bottom chassis. Particularly, the backlight may be fixedly coupled to a hole configured to pass thorough the bottom chassis. In this case, foreign material, e.g. dust, may be introduced to the inside of the display apparatus through the hole configured to pass through the bottom chassis. To prevent the foreign material from being introduced to the inside of the display apparatus, taping performed by attaching tape to the hole, may be used after fixing the backlight to the hole configured to pass through the bottom chassis. Accordingly, the cost for black tape may be additionally generated and the manufacturing process may be complicated caused by the taping operation.

An apparatus configured to display an image may be commonly referred to as a display apparatus. The display apparatus may include a television and a monitor. Hereinafter a television will be described as an example of the display apparatus. The television may include flat television, curved television, and a bendable television. Hereinafter the flat television will be described as an example of the television. However, it will be understood that the below description also applies to a curved television or a bendable television, etc.

Figure 1:
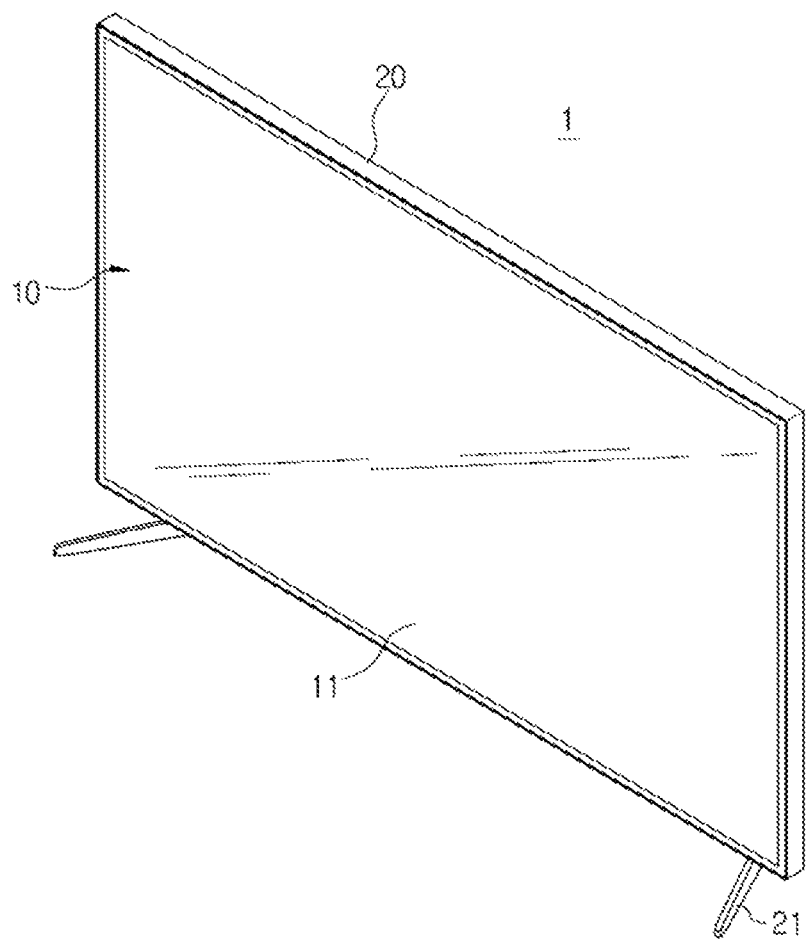
FIG. 1 is perspective view schematically illustrating a display apparatus according to an exemplary embodiment.
Figure 2:
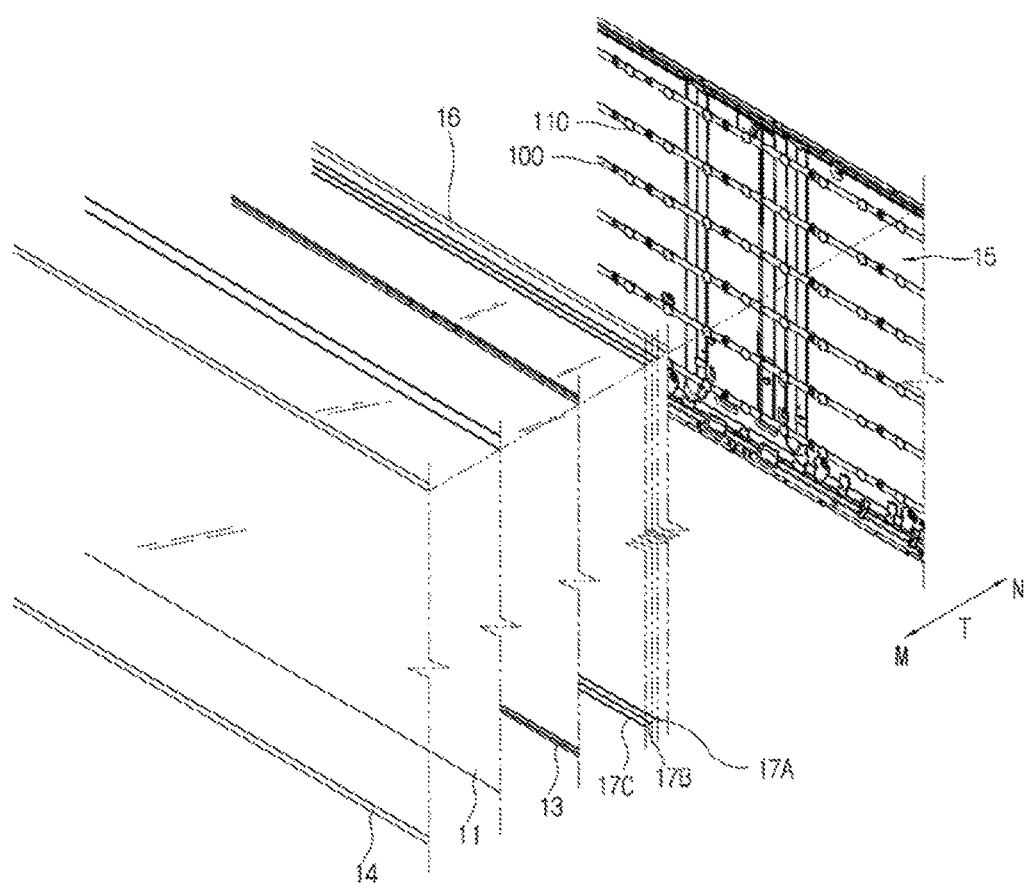
FIG. 2 is an exploded perspective view illustrating a display module applied to a display apparatus according to an exemplary embodiment.

FIG. 1 is perspective view schematically illustrating a display apparatus according to an exemplary embodiment and FIG. 2 is an exploded perspective view illustrating a display module applied to a display apparatus according to an exemplary embodiment.

As illustrated in FIGS. 1 and 2, a display apparatus 1 may include a display module 10 configured to display an image. The display module 10 may include a display panel 11. The display module 10 may have at least one of flat shape, a curved shape, and a bendable shape according to the type of the display apparatus 1. That is, when the display apparatus 1 is a flat television, as illustrated in FIG. 1, the display module 10 may have a flat shape. When the display apparatus 1 is a curved television, the display module 10 may have a curved shape. When the display apparatus 1 is a bendable television, the display module 10 may be transformable from the flat shape to the curved shape, and vice versa.

The display apparatus 1 may further include a case 20 in which the display module 10 and a variety of electric components are placed.

The case 20 may be provided to cover the display module 10 from the rear side of the display module 10. The case 20 may include a stand 21 so that the display apparatus 1 may be uprightly installed.

Although not shown, the display apparatus 1 may be fixed to the wall through a wall mounting bracket instead of the stand 21. The wall mounting bracket may be detachably installed in the case 20.

At the inside of the case 20, a power substrate (not shown) configured to supply power to the display apparatus 1, a signal process substrate (not shown) configured to process a variety of image signals and sound signals, and a timing control substrate (not shown) configured to transmit signals to the display panel 11 may be disposed.

As illustrated in FIG. 2, the display module 10 may include the display panel 11 including a liquid crystal panel.

The display module 10 may further include a middle mold 13 configured to support the display panel 11.

The display module 10 may further include a backlight 12 disposed in the rear side of the display panel 11 to supply light to the display panel 11. The backlight 12 may include a plurality of substrates 100 and a plurality of light sources 110 disposed on the substrates 100.

The plurality of substrates 110 may be coupled to a bottom chassis 15. The plurality of substrates 100 may be detachably coupled to the bottom chassis 15. The plurality of substrates 100 may be coupled to the bottom chassis 15 in a slide manner. The plurality of substrates 100 may be coupled to the bottom chassis 15 so that the plurality of light sources 110 may face the display panel 11 in order to transmit light to the display panel 11. The plurality of substrates 100 may be formed in a bar shape, which is extended in a longitudinal direction of the bottom chassis 15, and may be disposed to be vertically spaced apart from each other. The plurality of substrates 100 may be spaced apart from the bottom chassis 15.

The plurality of light sources 110 may be installed in the plurality of substrates 100 to supply a light to the display panel 11. The plurality of light sources 110 may be installed along a longitudinal direction of the plurality of substrates 100 (e.g., along direction X; refer to FIG. 3) to be spaced apart from each other. The plurality of light sources 110 may include a light emitting diode (LED) configured to generate a light. A detailed description of the plurality of substrates 100 will be provided below.

The display module 10 may further include a top chassis 14 coupled to a front side of the middle mold 13 so that the display panel 11 is installed in the middle mold 13.

The display module 10 may further include the bottom chassis 15 coupled to the rear side of the middle mold 13 so that the backlight 12 is disposed in a rear side of the display panel 11. A detailed description of the bottom chassis 15 will be provided below.

The display module 10 may further include a diffusion sheet 16. The diffusion sheet 16 may be formed in a flat sheet shape. The diffusion sheet 16 may be disposed between the display panel 11 and the backlight 12 so that a light supplied from the backlight 12 may be diffused.

In front of the diffusion sheet 16, a re-diffusion sheet 17A, a prism sheet 17B, and a protection sheet 17C may be disposed.

The re-diffusion sheet 17A may be disposed to face to the diffusion sheet 16 to diffuse again a light passed through the diffusion sheet 16. The prism sheet 17B may be disposed in front of the re-diffusion sheet 17A so that a light which is diffused by the re-diffusion sheet 17A may be concentrated in a perpendicular direction to the display panel 11. The prism sheet 17B may include a pattern in a prism shape. The 17C may be disposed in front of the prism sheet 17B to protect the prism sheet 17B.

Figure 3:
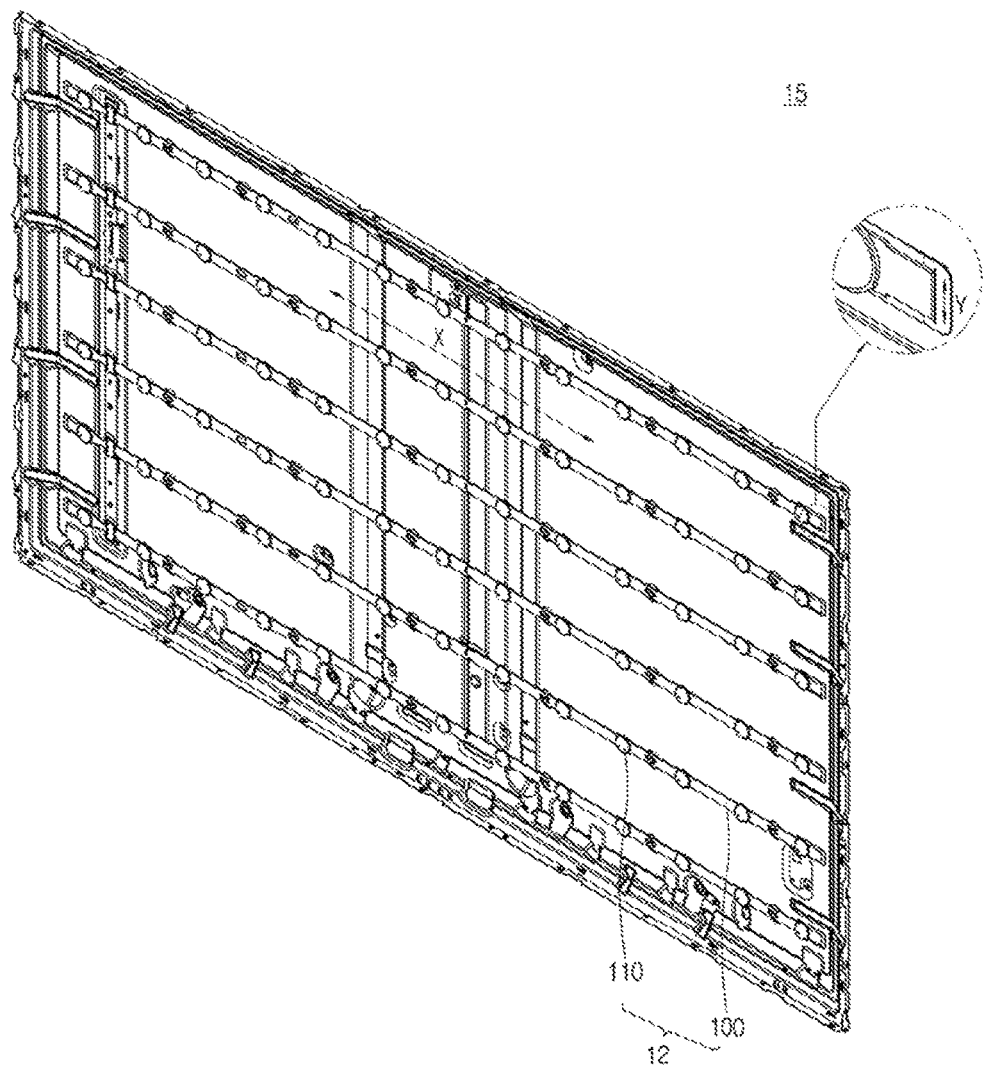
FIG. 3 is a perspective view illustrating a bottom chassis, to which a substrate is coupled, in a display apparatus according to an exemplary embodiment.
Figure 4:
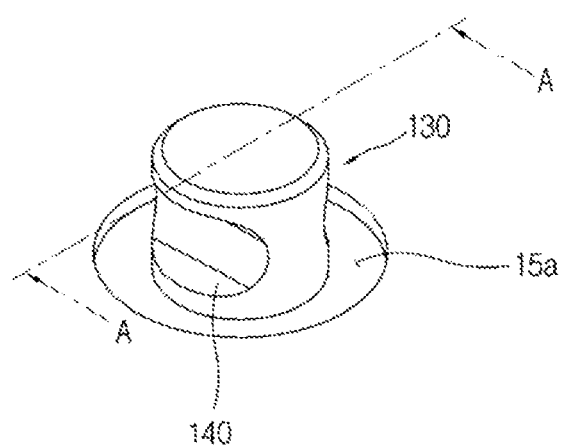
FIG. 4 is an enlarged view illustrating a fixing protrusion formed in a bottom chassis of a display apparatus according to an exemplary embodiment.
Figure 5:
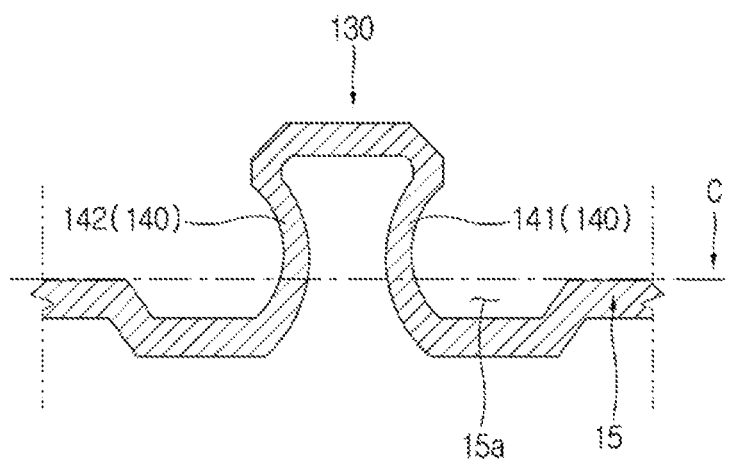
FIG. 5 is a cross-sectional view illustrating the fixing protrusion of FIG. 4 taken along A-A' of FIG. 4.
Figure 6A:
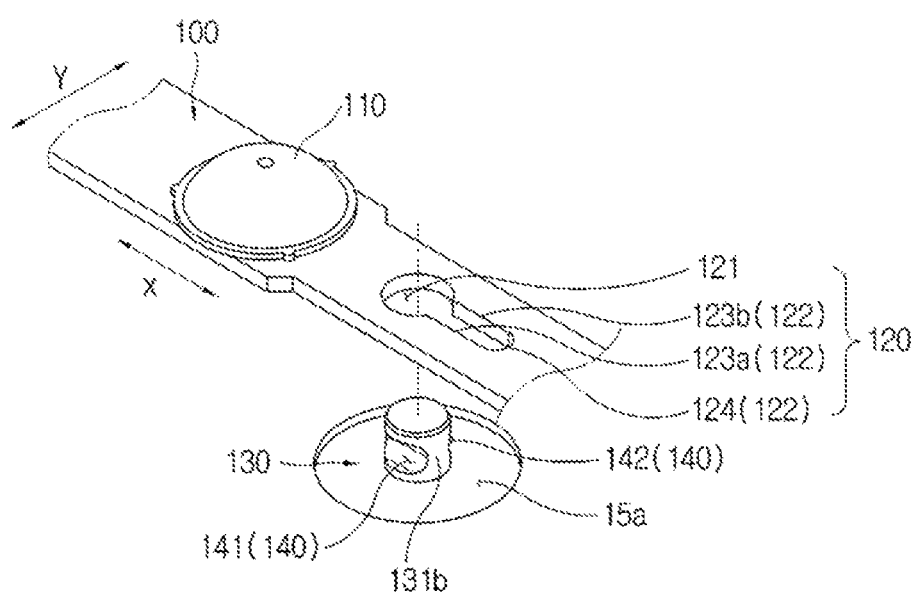
FIGS. 6A to 6C are views illustrating a process in which at least one fixing protrusion is coupled to at least one fixing hole, of a display apparatus according to an exemplary embodiment.

FIG. 3 is a perspective view illustrating a bottom chassis 15, to which a substrate is coupled, in a display apparatus according to an exemplary embodiment. FIG. 4 is an enlarged view illustrating a fixing protrusion formed in a bottom chassis of a display apparatus according to an exemplary embodiment, and FIG. 5 is a cross-sectional view illustrating the fixing protrusion of FIG. 4 taken along A-A' of FIG. 4. FIG. 6A illustrates a fixing hole 120 according to an exemplary embodiment. Hereinafter reference numerals not shown refer to FIGS. 1 and 2.

As illustrated in FIGS. 3 to 6A, the plurality of substrates 100 may include at least one fixing hole 120. The at least one fixing hole 120 may be formed on the plurality of substrates 100 to be adjacent to the plurality of light sources 110. The at least one fixing hole 120 may be formed on the plurality of substrates 100 to be disposed between the plurality of light sources 110.

The at least one fixing hole 120 may include a first coupling 121 and a second coupling 122, wherein the first coupling 121 and the second coupling may have a different width. Particularly, the first coupling 121 and the second coupling 122 may have a different width in a width direction (Y) of the plurality of substrates 100. The second coupling 122 may have a smaller width than that of the first coupling 121 in the width direction (Y) of the plurality of substrates 100.

At least one portion of the first coupling 121 may have a curved shape.

The second coupling 122 may be connected to the first coupling 121 in the longitudinal direction (X) of the plurality of substrates 100. That is, the second coupling 122 may be connected to the first coupling 121 so that a fixing protrusion 130 may be coupled to the fixing hole 120 to be moved from the first coupling 121 to the second coupling 122, and vice versa.

The second coupling 122 may include a guide including walls 123a and 123b. The walls 123a and 123b of the guide may be connected to the first coupling 121 in the longitudinal direction (X) of the plurality of substrates 100. The walls 123a and 123b of the guide may be disposed in parallel to each other.

The second coupling 122 may further include a limiter 124. The limiter 124 may limit a movement of the fixing protrusion 130 in the second coupling 122 in the longitudinal direction (X) of the plurality of substrates 100. The limiter 124 may connect the walls 123a and 123b of the guide. The limiter 124 may have a curved shape. The limiter 124 may be a wall of the second coupling 122. Alternatively, the limiter 124 may be a moveable portion placed between the walls 123a and 123b of the guide so as to slide along the guide.

The bottom chassis 15 may include at least one fixing protrusion 130. The at least one fixing protrusion 130 may be formed integrally with the bottom chassis 15. A process of forming the at least one fixing protrusion 130 integrally with the bottom chassis 15 will be described later.

The fixing protrusion 130 may be coupled to the fixing hole 120. The fixing protrusion 130 may be, for example, a boss. The fixing protrusion 130 may have a shape protruding toward the display panel 11. The fixing protrusion 130 may have a cylindrical shape extending from the bottom chassis 15 toward the display panel 11. However, the shape of the fixing protrusion 130 is not limited to the cylindrical shape, and thus may be provided as various shapes, e.g. faceted cylinders.

The fixing protrusion 130 may include the detachment prevention structure 140. Hereinafter a groove may be used in a same sense as a detachment prevention structure 140 (see FIG. 4).

The detachment prevention structure 140 may prevent the fixing protrusion 130 from being detached from the fixing hole 120.

The detachment prevention structure 140 may be formed to be recessed along at least one portion of the circumference of the fixing protrusion 130.

The detachment prevention structure 140 may include a first groove 141 and a second groove 142.

The first groove 141 may be formed to be recessed on a side of the fixing protrusion 130. The second groove 142 may be formed to be recessed on another side of the fixing protrusion 130 to be spaced apart from the first groove 141. The fixing protrusion 130 may be fixedly coupled to the fixing hole 120 in a way that fixing protrusion 130 may be inserted into the first coupling 121 and coupled to the walls 123a and 123b of the guide by the first groove 141 and the second groove 142 in a sliding manner. Particularly, the fixing protrusion 130 may be fixedly coupled to the second coupling 122 in a way that the walls 123a and 123b of the guide are inserted and coupled to the second coupling 122 in a sliding manner. That is, while the at least one fixing protrusion 130 is moved from the first coupling 121 to the second coupling 122 in a slide manner, one of the walls 123a and 123b of the guide may be coupled to the first groove 141 and another of the walls 123a and 123b of the guide may be coupled to the second groove 142.

The fixing protrusion 130 may further include a curved surface. As illustrated in FIG. 4, when the detachment prevention structure 140 is formed to be recessed along at least one portion of the circumference of the fixing protrusion 130, the fixing protrusion 130 may further include a first curved surface 131a and a second curved surface 131b disposed between the first groove 141 and second groove 142. Particularly, when the fixing protrusion 130 is inserted into the first coupling 121, the first curved surface 131a disposed between the first groove 141 and the second groove 142 may face away from the second coupling 122, and the second curved surface 131b disposed between the first groove 141 and the second groove 142 may face toward the second coupling 122. When the fixing protrusion 130 is fixedly coupled to the second coupling 122, the second curved surface 131b may face to the limiter 124 of the second coupling 122. The second curved surface 131b may have a shape corresponding to the limiter 124 of the second coupling 122.

A recess 15a may be formed in the bottom chassis 15. The recess 15a may be formed in the bottom chassis 15 to be recessed in a first direction (M) (see FIG. 2), which is toward the display panel 11 in a thickness direction (T) of the bottom chassis 15, and to be recessed in a second direction (N), which is opposite to the first direction (M). That is, the recess 15a may be formed to be recessed in the bottom chassis 15 to be spaced apart from a contact surface (C) (see FIG. 5) between the plurality of substrates 100 and the bottom chassis 15, in the thickness direction (T) of the bottom chassis 15. The recess 15a may prevent the bottom chassis 15 from being deformed when the plurality of substrates 100 is coupled to the bottom chassis 15. That is, the recess 15a may be a role of giving hardness to the bottom chassis 15.

The fixing protrusion 130 may be provided in the recess 15a, as shown in FIG. 4.

Figure 6B:
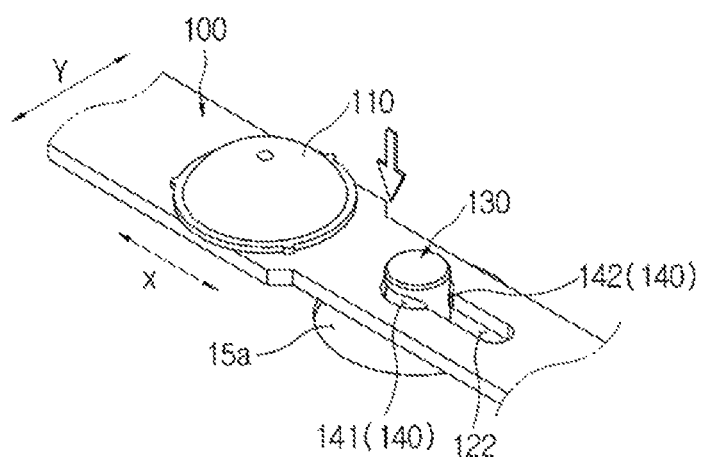
Figure 6C:
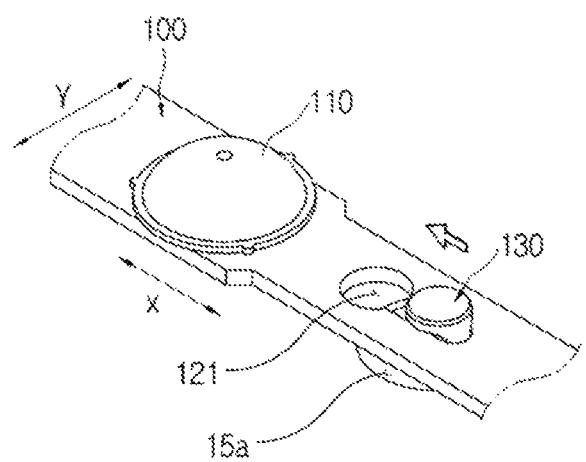

FIGS. 6A to 6C are views illustrating a process in which at least one fixing protrusion is coupled to at least one fixing hole, respectively, of a display apparatus according to an exemplary embodiment. Hereinafter reference numerals not shown refer to FIGS. 3 and 5.

The at least one fixing protrusion 130 may be detachably coupled to the at least one fixing hole 120 in a sliding manner.

After being inserted into the first coupling 121, the at least one fixing protrusion 130 may be fixedly coupled to the second coupling 122 in a sliding manner along the longitudinal direction (X) of the plurality of substrates 100. Hereinafter with reference to FIGS. 6A to 6C, a process of fixedly coupling the at least one fixing protrusion 130 to the at least one fixing hole 120 will be described in detail.

As illustrated in FIGS. 3 and 6A, the plurality of substrates 100 may be disposed in an upper side of the bottom chassis 15 so that the at least one fixing protrusion 130 and the first coupling 121 of the at least one fixing hole 120 may face to each other.

As illustrated in FIGS. 3 and 6B, the plurality of substrates 100 may be moved so that the at least one fixing protrusion 130 may be inserted into the first coupling 121. The first groove 141 and the second groove 142 may be spaced apart from the first coupling 121 in the width direction (Y) of the plurality of substrates 100

As illustrated in FIG. 6C, in a state in which the at least one fixing protrusion 130 is inserted into the first coupling 121, in order that the at least one fixing protrusion 130 is moved from the first coupling 121 to the second coupling 122, the plurality of substrates 100 may be moved in the longitudinal direction (X) (see outlined arrow in FIG. 6C) and then the at least one fixing protrusion 130 may be fixedly coupled to the second coupling 122. The walls 123a and 123b of the guide may be inserted and coupled to the first groove 141 and the second groove 142, respectively. In addition, the movement of the plurality of substrates 100 may be limited by the limiter 124 of the second coupling 122.

A process of separating the at least one fixing protrusion 130 from the at least one fixing hole 120 may be performed by performing the above operations in an order, which is reverse of the order of the process of fixedly coupling the at least one fixing protrusion 130 to the at least one fixing hole 120, as mentioned above, and thus a description thereof will be omitted.

Figure 7:
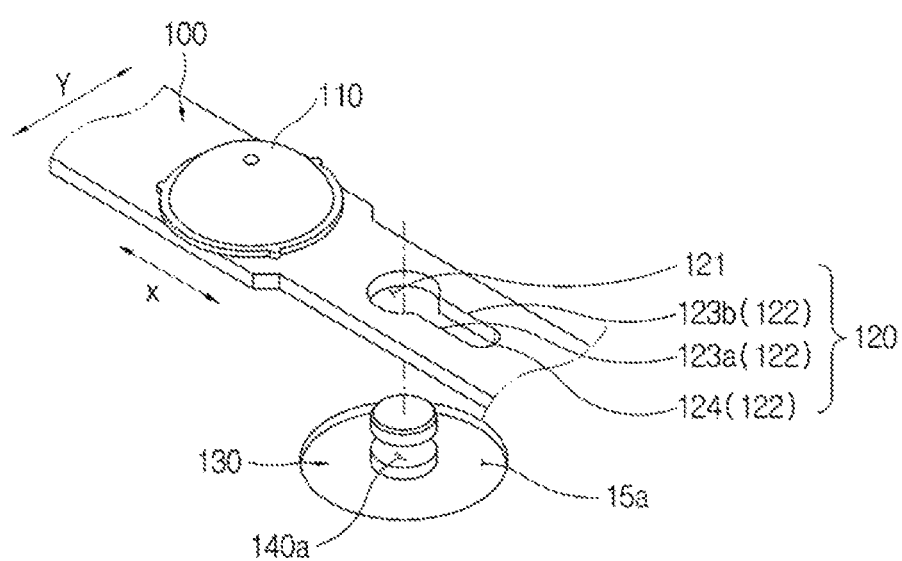
FIG. 7 is a view illustrating a connection relation between at least one fixing protrusion formed in a bottom chassis, and at least one fixing hole formed in a substrate in a display apparatus according to another exemplary embodiment.

FIG. 7 is a view illustrating a connection relation between at least one fixing protrusion formed in a bottom chassis, and at least one fixing hole formed in a substrate in a display apparatus according to another exemplary embodiment.

As illustrated in FIG. 7, a detachment prevention structure 140a may be formed to be recessed along a circumference of the at least one fixing protrusion 130. That is, the detachment prevention structure 140a may be recessed to have a shape of a band around the at least one fixing protrusion 130.

FIGS. 8A-8D are views schematically illustrating a process of forming at least one fixing protrusion, in a display apparatus according to an exemplary embodiment. Hereinafter reference numerals not shown refer to FIGS. 3 to 5. Hereinafter "molding" and "forming" will be used interchangeably. A process of forming the at least one fixing protrusion 130 on a flat bottom chassis 15 such as a flat TV will be described by way of example.

The at least one fixing protrusion 130 may be formed with the bottom chassis 15.

When the at least one fixing protrusion 130 is formed with the bottom chassis 15, a process in which the at least one fixing protrusion 130 is manufactured separately and then attached to the bottom chassis 15 may be omitted, and thus it may be expected to simplify the manufacturing process and manufacturing cost savings. In addition, the at least one fixing protrusion 130 may be formed with the bottom chassis 15 so that a strong bond between the at least one fixing protrusion 130 and the bottom chassis 15 may be implemented.

A process of forming the at least one fixing protrusion 130 is as follows.

Figure 8A:
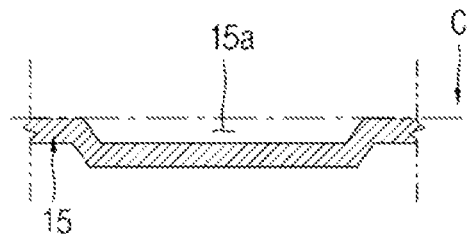
FIGS. 8A-8D are views schematically illustrating a process of forming at least one fixing protrusion, in a display apparatus according to an exemplary embodiment.

As illustrated in FIG. 8A, the recess 15a may be formed in the bottom chassis 15. The recess 15a may be formed in the bottom chassis 15 by embossing process. The recess 15a may reinforce a hardness of the bottom chassis 15. Particularly, the recess 15a may prevent the bottom chassis 15 from being deformed when forming the at least one fixing protrusion 130 on the bottom chassis 15. The recess 15a may be formed to be recessed in the bottom chassis 15 to be downwardly spaced apart from the contact surface (C) of the plurality of substrates 100 and the bottom chassis 15, in the thickness direction (T) (see FIG. 2) of the bottom chassis 15.

Figure 8B:
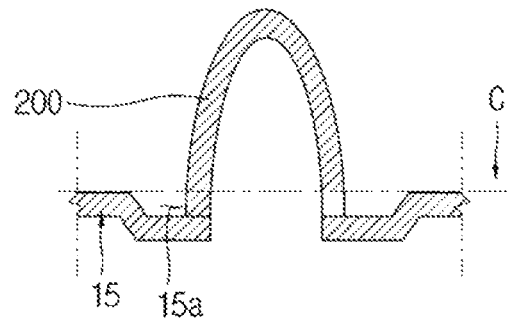

As illustrated in FIG. 8B, a first at least one fixing protrusion 200 may be formed in the bottom chassis 15. The first at least one fixing protrusion 200 may be formed in the bottom chassis 15 by press process. Particularly, the first at least one fixing protrusion 200 may be formed in the recess 15a of the bottom chassis 15 by press process.

Figure 8C:
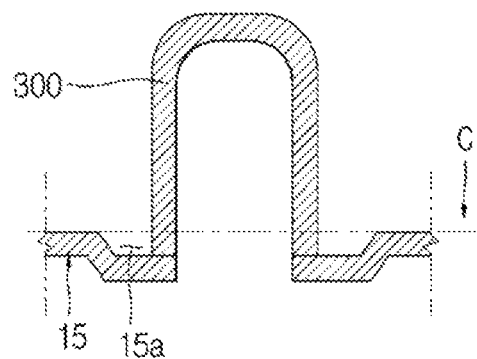

As illustrated in FIG. 8C, a second at least one fixing protrusion 300 may be formed on top of the first at least one fixing protrusion 200 in the bottom chassis 15. That is, the second at least one fixing protrusion 300 may be formed by additional press process on the first at least one fixing protrusion 200.

As illustrated in FIGS. 8B and 8C, a process of forming an external appearance of the at least one fixing protrusion 130 may be repeated at least twice. However, this is only an example. Alternatively, the at least one fixing protrusion may be formed only once such that the at least one fixing protrusion 130 is formed on the bottom chassis 15 by a single press process. Alternatively, the at least one fixing protrusion may be formed using a plurality of applications of a press process, e.g., such that the processes shown in FIGS. 8B and 8C are repeated. When the at least one fixing protrusion 130 is formed through the process illustrated in FIGS. 8B and 8C, a next process may be proceed.

Figure 8D:
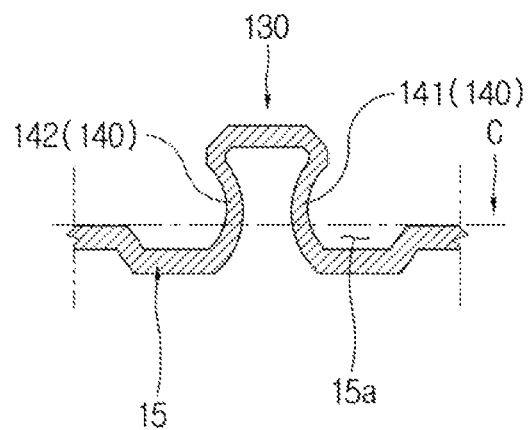

As illustrated in FIG. 8D, the detachment prevention structure 140 may be formed in the at least one fixing protrusion 130. The detachment prevention structure 140 may be formed along at least one portion of the circumference of the at least one fixing protrusion 130 by punch (not shown).

According to the above-mentioned process, the at least one fixing protrusion 130 having the detachment prevention structure 140 may be formed with the bottom chassis 15. Alternatively, the at least one fixing protrusion 130 having the detachment prevention structure 140 may be formed integrally with the bottom chassis 15 using a mold.

FIGS. 9A-9E are views schematically illustrating a process of forming at least one fixing protrusion, in a display apparatus according to another exemplary embodiment. Hereinafter reference numerals not shown refer to FIGS. 3 to 5. Hereinafter "molding" and "forming" will be used interchangeably. A process of forming the at least one fixing protrusion 130 on a flat bottom chassis 15 such as a flat TV will be described by way of example.

The at least one fixing protrusion 130 may be formed with the bottom chassis 15.

When the at least one fixing protrusion 130 is formed with the bottom chassis 15, a process in which the at least one fixing protrusion 130 is manufactured separately and then attached to the bottom chassis 15 may be omitted, and thus it may be expected to simplify the manufacturing process and manufacturing cost savings. In addition, the at least one fixing protrusion 130 is formed with the bottom chassis 15 so that a strong bond between the at least one fixing protrusion 130 and the bottom chassis 15 may be implemented.

A process of forming the at least one fixing protrusion 130 is as follows.

Figure 9A:
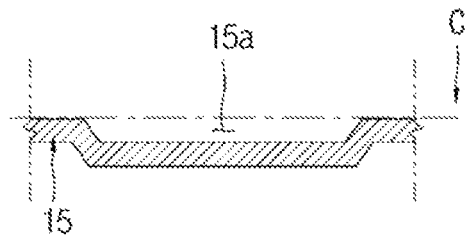
FIGS. 9A-9E are views schematically illustrating a process of forming at least one fixing protrusion, in a display apparatus according to another exemplary embodiment.

As illustrated in FIG. 9A, the recess 15a may be formed in the bottom chassis 15. The recess 15a may be formed in the bottom chassis 15 by embossing process. The recess 15a may play a role of reinforcing hardness of the bottom chassis 15. Particularly, the recess 15a may prevent the bottom chassis 15 from being deformed when forming the at least one fixing protrusion 130 on the bottom chassis 15. The recess 15a may be formed to be recessed in the bottom chassis 15 to be downwardly spaced apart from the contact surface (C) of the plurality of substrates 100 and the bottom chassis 15, in the thickness direction (T) (see FIG. 2) of the bottom chassis 15.

Figure 9B:
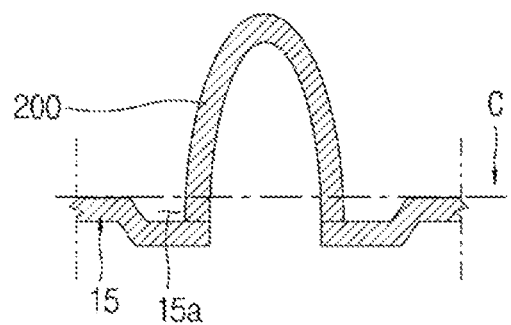

As illustrated in FIG. 9B, a first at least one fixing protrusion 200 may be formed in the bottom chassis 15. The first at least one fixing protrusion 200 may be formed in the bottom chassis 15 by press process. Particularly, the first at least one fixing protrusion 200 may be formed in the recess 15a of the bottom chassis 15 by press process.

Figure 9C:
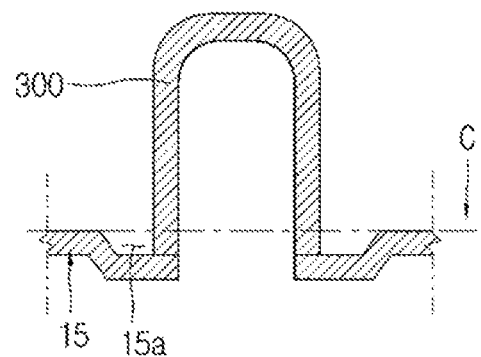

As illustrated in FIG. 9C, a second at least one fixing protrusion 300 may be formed on top of the first at least on fixing protrusion 200 in the bottom chassis 15. That is, the second at least one fixing protrusion 300 may be formed by additional press process on the first at least one fixing protrusion 200.

As illustrated in FIGS. 9B and 9C, a process of forming an external appearance of the at least one fixing protrusion 130 may be repeated at least twice. However, this is only an example. Alternatively, the at least one fixing protrusion may be formed only once such that the at least one fixing protrusion 130 is formed on the bottom chassis 15 by a single press process. Alternatively, the at least one fixing protrusion may be formed using a plurality of applications of a press process, e.g., such that the processes shown in FIGS. 9B and 9C are repeated. When the at least one fixing protrusion 130 is formed through the process illustrated in FIGS. 9B and 9C, a next process may be proceed.

Figure 9D:
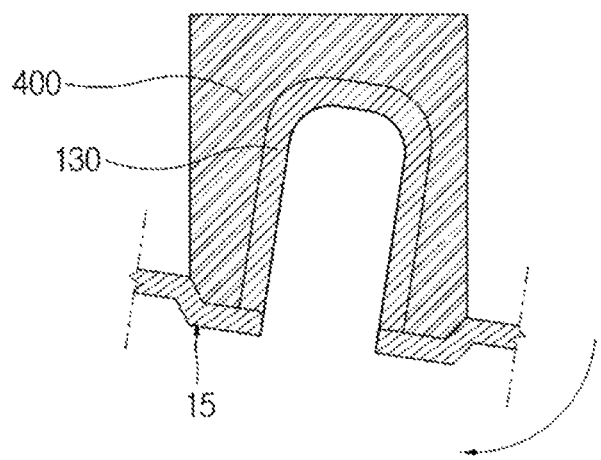

As illustrated in FIG. 9D, the bottom chassis 15 may be deformed. Particularly, in a state in which the at least one fixing protrusion 130 is firmly fixed by a fixation device 400, a force may be applied to the bottom chassis 15. For example, the bottom chassis 15 may be bent with a certain angle, as illustrated by the arrow in FIG. 9D.

Figure 9E:
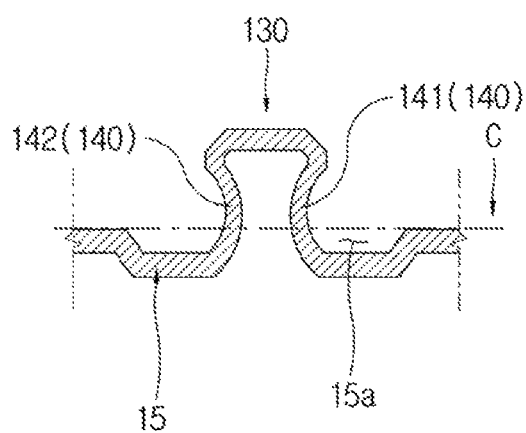

As illustrated in FIG. 9E, the detachment prevention structure 140 may be formed in the at least one fixing protrusion 130. The detachment prevention structure 140 may be formed along at least one portion of the circumference of the at least one fixing protrusion 130 by punch (not shown).

According to the above-mentioned process, the at least one fixing protrusion 130 having the detachment prevention structure 140 may be formed with the bottom chassis 15. Alternatively, the at least one fixing protrusion 130 having the detachment prevention structure 140 may be formed integrally with the bottom chassis 15 using a mold.

Hereinbefore although the plurality of substrates 100 disposed in the rear side of the display panel 11, and the display module 10 having the backlight 12 including the plurality of light sources 110 installed in the plurality of substrates 100 are described, the present disclosure may be applied to a display module provided with a light guide plate disposed in the rear side of a display panel, a substrate disposed to face to each other on opposite sides of the light guide plate, and a backlight including a plurality of light sources installed in the substrate.

As is apparent from the above description, according to the exemplary embodiments, by removing a hole, which is passing through a bottom chassis and required in a process of coupling a backlight to the bottom chassis in the related art, dust and foreign materials may be prevented from being introduced to the inside of the display apparatus through the hole passing through the bottom chassis.

Since the coupling of the backlight and the bottom chassis is implemented by the coupling of at least one fixing hole and at least one fixing protrusion, a black taping, which is needed to block a hole passing through a bottom chassis according to the related art, may be omitted thus simplifying the manufacturing process and increasing manufacturing cost savings.

By employing a sliding manner, the backlight may be easily coupled to the bottom chassis.

By forming a groove in at least one fixing protrusion, the coupling force between at least fixing hole and at least one fixing protrusion may be improved.

By forming at least one fixing protrusion and the bottom chassis using the above described process, a process of the related art in which at least one fixing protrusion is manufactured separately and then attached to the bottom chassis, may be omitted.

Although a few exemplary embodiments have been shown and described, it would be appreciated by those skilled in the art that changes may be made in these exemplary embodiments without departing from the principles and spirit of the disclosure, the scope of which is defined in the claims and their equivalents.

What is claimed is:

1. A display apparatus comprising:
a display panel;
a plurality of substrates, each substrate provided with a plurality of light sources to emit light toward the display panel and at least one fixing hole formed between the plurality of light sources; and
a bottom chassis to which the plurality of substrates are coupled, the bottom chassis including a plurality of fixing protrusions to be coupled to corresponding ones of the fixing holes of the plurality of substrates,
wherein each of the fixing protrusions are formed with the bottom chassis to have a detachment prevention structure so that the fixing protrusions are prevented from being detached from the fixing holes.

2. The display apparatus of claim 1 wherein,
the plurality of substrates are detachably coupled to the bottom chassis.

3. The display apparatus of claim 1 wherein,
the plurality of substrates are coupled to the bottom chassis in a sliding manner.

4. The display apparatus of claim 1 wherein,
the plurality of substrates are coupled to the bottom chassis such that the plurality of light sources face the display panel to emit light toward the display panel.

5. The display apparatus of claim 1 wherein,
a recess is formed in the bottom chassis,
the recess is recessed toward a first direction, which is toward the display panel in a thickness direction of the bottom chassis, and toward a second direction opposite to the first direction, and
the at least one fixing protrusion is formed in the recess.

6. The display apparatus of claim 1 wherein,
the at least one fixing hole comprises a first coupling and a second coupling, which is connected to the first coupling in a longitudinal direction of the plurality of substrates and has a different width from a width of the first coupling in a width direction of the plurality of substrates.

7. The display apparatus of claim 6 wherein,
the at least one fixing protrusion is inserted into the first coupling, and then fixedly coupled to the second coupling in a sliding manner in the longitudinal direction of the plurality of substrates.

8. The display apparatus of claim 6 wherein,
the detachment prevention structure comprises a first groove recessed on a side of the at least one fixing protrusion and a second groove recessed on another side of the at least one fixing protrusion to be spaced apart from the first groove, wherein the at least one fixing protrusion is fixedly coupled to the at least one fixing hole in a sliding manner while the second coupling is inserted into and coupled to the first groove and the second groove.

9. The display apparatus of claim 8 wherein,
the second coupling comprises guide walls connected to the first coupling in the longitudinal direction of the plurality of substrates, and a limiter configured to connect the guide walls on a side of the second coupling that is away from the first coupling, and configured to limit the movement of the at least one fixing protrusion toward the second coupling from the first coupling in the longitudinal direction of the plurality of substrates,
wherein one of the guide walls is coupled to the first groove and another of the guide walls is coupled to the second groove when the at least one fixing protrusion is moved from the first coupling to the second coupling in a sliding manner.

10. The display apparatus of claim 1 wherein,
the detachment prevention structure is formed to be recessed along at least one portion of the circumference of the at least one fixing protrusion.

11. A display apparatus comprising:
a display panel;
a plurality of substrates, each substrate provided with a plurality of light sources to apply a light to the display panel and at least one fixing hole; and
a bottom chassis, to which the plurality of substrates are coupled so that the plurality of light sources face the display panel to emit light toward the display panel, the bottom chassis formed with a plurality of fixing protrusion having a protruding shape toward the display panel to be coupled to the corresponding ones of the fixing holes of the plurality of substrates.

12. The display apparatus of claim 11 wherein, the plurality of fixing protrusions are detachably coupled to the at least one fixing hole in a sliding manner.

13. The display apparatus of claim 11 wherein, the at least one fixing hole comprises a first coupling and a second coupling, which is connected to the first coupling in a longitudinal direction of the plurality of substrates and has a smaller width than a width of the first coupling in a width direction of the plurality of substrate.

14. The display apparatus of claim 13 wherein, each of the plurality of fixing protrusions comprises a groove recessed along at least one portion of the circumference of the fixing protrusion, the second coupling comprises guide walls connected to the first coupling in the longitudinal direction of the plurality of substrates and disposed in parallel with each other, and at least one of the guide walls is coupled to the groove when the corresponding fixing protrusion is slid from the first coupling to the second coupling.

15. The display apparatus of claim 14 wherein, the second coupling further comprises a limiter having a curved surface shape, configured to limit movement of the fixing protrusion toward the second coupling from the first coupling in the longitudinal direction of the plurality of substrates, and configured to connect the guide walls.

16. The display apparatus of claim 11 wherein, the bottom chassis comprises a recess formed therein, the recess recessed to be spaced apart from a contact surface between the plurality of substrates and the bottom chassis, wherein the plurality of fixing protrusions are provided in the recess.

17. A display apparatus comprising:
a display panel;
a bottom chassis having a recess formed therein and comprising a boss that is formed in the recess, the boss comprising at least one groove in a side surface thereof;
a backlight comprising a plurality of substrates, each substrate provided with at least one light source that emits light toward the display panel and a hole and guide walls connected to the hole, the guide walls having a width therebetween that is smaller than a circumference of the hole,
wherein, when the boss is inserted in the hole and slid along the guide walls, the at least one groove couples the boss to the guide walls to secure the backlight to the bottom chassis.

18. The display apparatus of claim 17, wherein:
the plurality of substrates contact the bottom chassis at a contact surface, and
the recess is downwardly spaced apart from the contact surface in a thickness direction of the bottom chassis.

19. The display apparatus of claim 18, wherein the recess is downwardly spaced apart from the contact surface by an amount such that the at least one groove of the boss provided in the recess mates with the guide walls.

20. The display apparatus of claim 17, wherein:
the bottom chassis has a plurality of the recesses formed therein, each recess comprising a respective boss, each boss comprising at least one groove in a side surface thereof,
each of the plurality of substrates is provided with a plurality of light sources, each light source comprising, adjacent thereto, a hole and guide walls connected to the hole, and
when the bosses are inserted in the holes, respectively, and slid along the guide walls, the grooves of the bosses couple the bosses to the guide walls to secure the substrate to the bottom chassis.

* * * * *